(12) United States Patent
Jones et al.

(10) Patent No.: US 9,190,819 B2
(45) Date of Patent: Nov. 17, 2015

(54) FASTENER ASSEMBLY AND ELECTRICAL JUNCTION BOX FOR SAME

(71) Applicant: IPEX TECHNOLOGIES INC., Mississauga (CA)

(72) Inventors: David Gordon Jones, Oakville (CA); Richard Hugh Schlieker, Mississauga (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 142 days.

(21) Appl. No.: 13/815,619

(22) Filed: Mar. 13, 2013

(65) Prior Publication Data

US 2014/0263298 A1    Sep. 18, 2014

(51) Int. Cl.
  *H02G 3/14*  (2006.01)
  *B65D 17/52* (2006.01)
  *H02G 3/08*  (2006.01)

(52) U.S. Cl.
  CPC . *H02G 3/14* (2013.01); *H02G 3/081* (2013.01)

(58) Field of Classification Search
  CPC ....... H02G 3/14; H02G 3/081; B65D 2555/02
  USPC .......... 220/3.8, 4.02, 210, 323, 325, 324, 284
  See application file for complete search history.

(56) References Cited

U.S. PATENT DOCUMENTS

| | | | |
|---|---|---|---|
| 1,208,618 A | 12/1916 | Morrison | |
| 1,367,683 A * | 2/1921 | Bentley | 220/325 |
| 1,784,551 A * | 12/1930 | Smith | 220/210 |
| 2,263,842 A | 11/1941 | Gross | |
| 2,263,843 A | 11/1941 | Gross | |
| 2,642,016 A | 6/1953 | Thalmann | |
| 2,803,372 A * | 8/1957 | Lee | 220/325 |
| 3,296,763 A | 1/1967 | Curl | |
| 3,297,153 A * | 1/1967 | Fattori | 206/403 |
| 3,480,311 A | 11/1969 | Lanham, Jr. | |
| 3,858,752 A * | 1/1975 | Marvin et al. | 220/325 |
| 3,951,300 A | 4/1976 | Kalasek | |
| 4,129,395 A | 12/1978 | Theurer | |
| 4,358,130 A | 11/1982 | Adams | |
| 4,678,620 A * | 7/1987 | Marshall et al. | 376/203 |
| 4,941,588 A | 7/1990 | Flider | |
| 5,050,764 A | 9/1991 | Voss | |
| 5,123,795 A | 6/1992 | Engel | |
| 5,361,925 A * | 11/1994 | Wecke et al. | 220/325 |
| 5,750,924 A * | 5/1998 | Sonntag et al. | 174/50 |
| 5,865,336 A | 2/1999 | Krzywdziak | |
| 5,915,575 A * | 6/1999 | Morris, Sr. | 215/214 |
| 6,073,792 A * | 6/2000 | Campbell et al. | 220/284 |

(Continued)

OTHER PUBLICATIONS

IPEX Technologies Inc., Box and Gasket Assembly, Jul. 19, 2011, 1 page containing 3 photo views, Mississauga ON Canada.

*Primary Examiner* — Mickey Yu
*Assistant Examiner* — Niki Eloshway

(57) ABSTRACT

A fastener assembly for releaseably fastening a first body to a second body is disclosed. The fastener assembly has a manual rotating mechanism to permit closing of the fastener by hand. Once closed, the manual rotating mechanism is not easily accessible to the user by hand. A separate tool operating rotating mechanism is accessible by a tool when the fastening mechanism is in the closed position. The fastening mechanism can be used to fasten a lid to a box in which case the lid has a recess for receiving the manual rotating mechanism.

20 Claims, 8 Drawing Sheets

(56) References Cited

U.S. PATENT DOCUMENTS

| | | |
|---|---|---|
| 6,530,629 B2 | 3/2003 | Shyr |
| 7,032,708 B2 | 4/2006 | Popken |
| 7,607,553 B2 | 10/2009 | Weber |
| 7,997,841 B2 | 8/2011 | Show |
| 8,353,417 B1 * | 1/2013 | Wu .............................. 220/23.4 |
| 2011/0262243 A1 | 10/2011 | Glickman |

* cited by examiner

Fig. 4
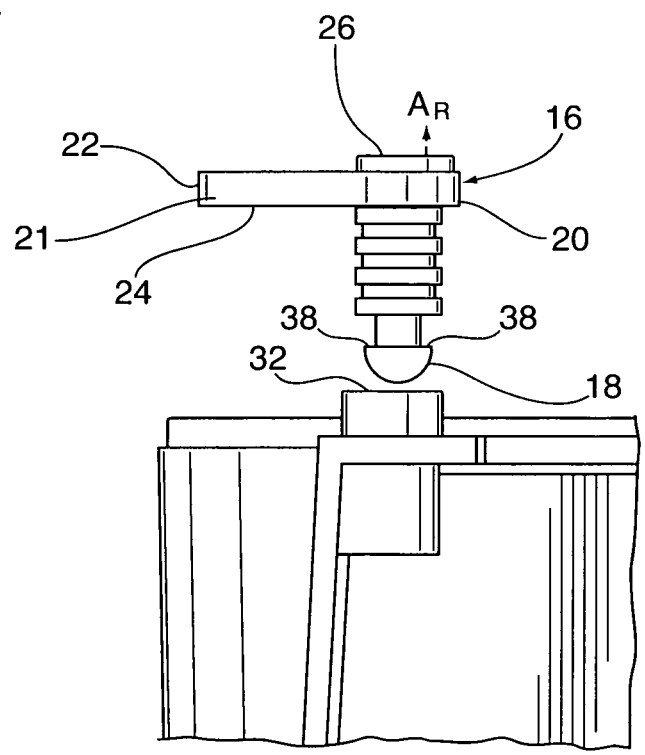
Fig. 5
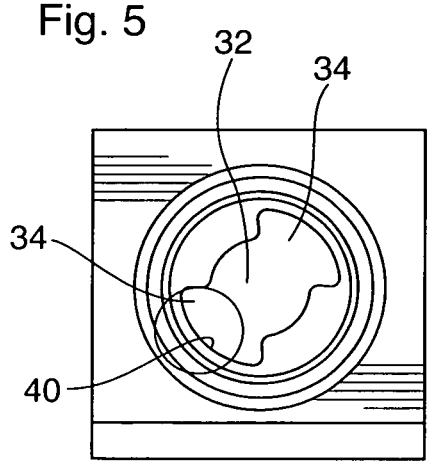
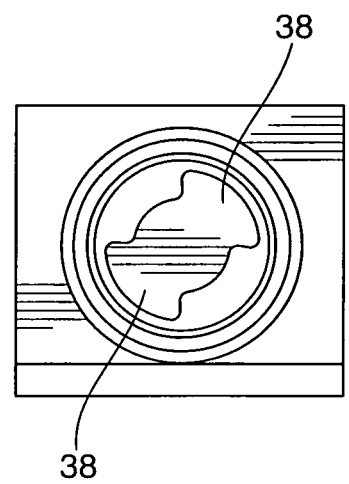
Fig. 6

FASTENER ASSEMBLY AND ELECTRICAL JUNCTION BOX FOR SAME

FIELD OF THE INVENTION

The present invention relates to a fastener assembly for releaseably fastening a first body to a second body. In particular, the invention relates to a fastener assembly for releaseably fastening a container and a lid of an electrical junction box.

BACKGROUND OF THE INVENTION

A variety of fastener arrangements are known in the prior art for fastening two or more objects together. For example, there are prior art fastener arrangements that require a tool for both fastening and unfastening. One such arrangement is disclosed in U.S. Pat. No. 5,361,925 to Wecke et al., Nov. 8, 1994, which discloses a fastener arrangement for fastening a cover and a base of a terminal box. Locking bolts with slotted heads at one end and blade-like expansions at the other are used to fasten the cover to the base. Each locking bolt is pushed downwards with a suitable tool through aligned bores in the cover and base, and then each locking bolt is turned slightly with the tool so that the blades cannot be withdrawn from the aligned bores. Detachment of the cover from the base is carried out by turning each locking bolt with the suitable tool to bring the blade again in alignment with the bores, allowing the locking bolts to be removed therefrom.

It is also known in the prior art to use manual rotating mechanisms for both fastening and unfastening. For example, U.S. Pat. No. 6,530,629 to Shyr, Mar. 11, 2003, discloses a cam system for retaining a press strip against a plurality of interface cards on a computer casing. The system uses a cam button that extends through the computer casing and forms an integral body with a female seat located inside the computer casing, such that the female seat and cam button rotate synchronously. By manually rotating the female seat, the cam button can be moved to hold the press strip in place against the interface cards. The cam button can be released with further manual rotation of the female seat.

One difficulty with manually operated mechanisms is that they may become opened or closed unintentionally. In other words, the ease of manual operation can limit security and accidental opening may result. Also, manually operated mechanisms may not be very strong or provide a secure seal, such as when used in a lid.

There is, accordingly, a need in the prior art for a fastener arrangement having a manually operated mechanism that can be operated by hand for ease of use during closing, but is secure after closing.

SUMMARY OF THE INVENTION

Accordingly, it is an object of this invention to at least partially overcome some of the disadvantages of the prior art. Also, it is an object of this invention to provide an improved type of fastener assembly having a manually operated mechanism that can be operated by hand to fasten two bodies together, but requires a tool to unfasten the two bodies.

Accordingly, in one of its aspects, this invention resides in a fastener assembly for releaseably fastening a first body to a second body, the fastener assembly comprising: a moveable fastening member rotateably fixed to the first body, said moveable fastening member having an open position, in which the first body and the second body are detachable from each other, and a closed position, in which the first body and the second body are fastened together; a manual rotating mechanism on the moveable fastening member that permits rotation by hand of the moveable fastening member from the open position to the closed position; a recess in the second body that receives at least a portion of the manual rotating mechanism when the moveable fastening member is in the closed position and restricts manual movement of the manual rotating mechanism in the closed position; and a tool-operated rotating mechanism on the moveable fastening member that is accessible when the moveable fastening member is in the closed position and permits rotation by a tool of the moveable fastening member from the closed position to the open position.

In a further aspect, the present invention resides in an electrical junction box, comprising: a container; a lid detachably securable to the container and having at least one recess; and at least one fastener rotateably fixed to the container, each fastener comprising: a manual rotating mechanism that permits movement by hand of the fastener from an open position, in which the container and the lid are detachable from each other, to a closed position, in which the container and the lid are secured together and at least a portion of the manual rotating mechanism is received in a corresponding one of the recesses so as to restrict access to the manual rotating mechanism; and a tool-operated rotating mechanism that is accessible when the fastener is in the closed position and permits rotation of the fastener by a tool from the closed position to the open position.

At least one advantage of the fastener assembly according to at least some embodiments of the present invention is that it permits fastening to be done by hand, which in preferred embodiments makes the fastening process quick, simple, and easy. Furthermore, because in at least some embodiments the manual rotating mechanism is not easily accessible in the closed position, a tool is required to unfasten. In this way, the fastener assembly can provide added security against unauthorized or accidental unfastening but still be easily fastened by hand. For example, only those with the required tool will be able to unfasten the assembly, as the hand operated rotating mechanism is substantially inaccessible when fastened. This likewise decreases the chances of accidental unfastening, as the substantially inaccessible hand operated rotating mechanism is less likely to be accidentally engaged and rotated into the open position.

A further advantage of the fastener assembly is that, in preferred embodiments, the manual rotating mechanism is a tab that provides leverage for rotating the fastener. This makes the fastening process by hand easier, as less force is required to move the fastener into the closed position. In preferred embodiments, the tool-operated rotating mechanism requires more force than the manual rotating mechanism in order to rotate the fastener. This provides added security, as the fastener can be easily closed, but it is significantly more difficult to open because there is no corresponding leverage when opening.

A further advantage of the present invention is that, in a preferred embodiment, the lid of the electrical junction box is provided with supporting ribs. These supporting ribs can advantageously be provided proximate the recesses in the lid, providing added support to this region. This improves the security of the electrical junction box, as the added support may decrease the likelihood of the lid cracking or breaking in the area of the recesses, thereby exposing the manual rotating mechanism or otherwise detaching the lid from the container. Furthermore, in a preferred embodiment the supporting ribs are located only in the perimeter portion of the lid and not in the center. This permits the user of the electrical junction box to drill holes into the center portion of the lid without interfering with the added support provided by the supporting ribs.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 4 shows a side view of a fastener in alignment with a bore of the electrical junction box container prior to insertion;

FIG. 5 shows a cross-sectional view of a bore of an electrical junction box container;

FIG. 6 shows a cross-sectional view of a bore of an electrical junction box container and a first end of a fastener within the bore;

DETAILED DESCRIPTION OF THE PREFERRED EMBODIMENTS

Preferred embodiments of the invention and its advantages can be understood by referring to the present drawings. In the present drawings, like numerals are used for like corresponding parts of the accompanying drawings.

Figure 1:
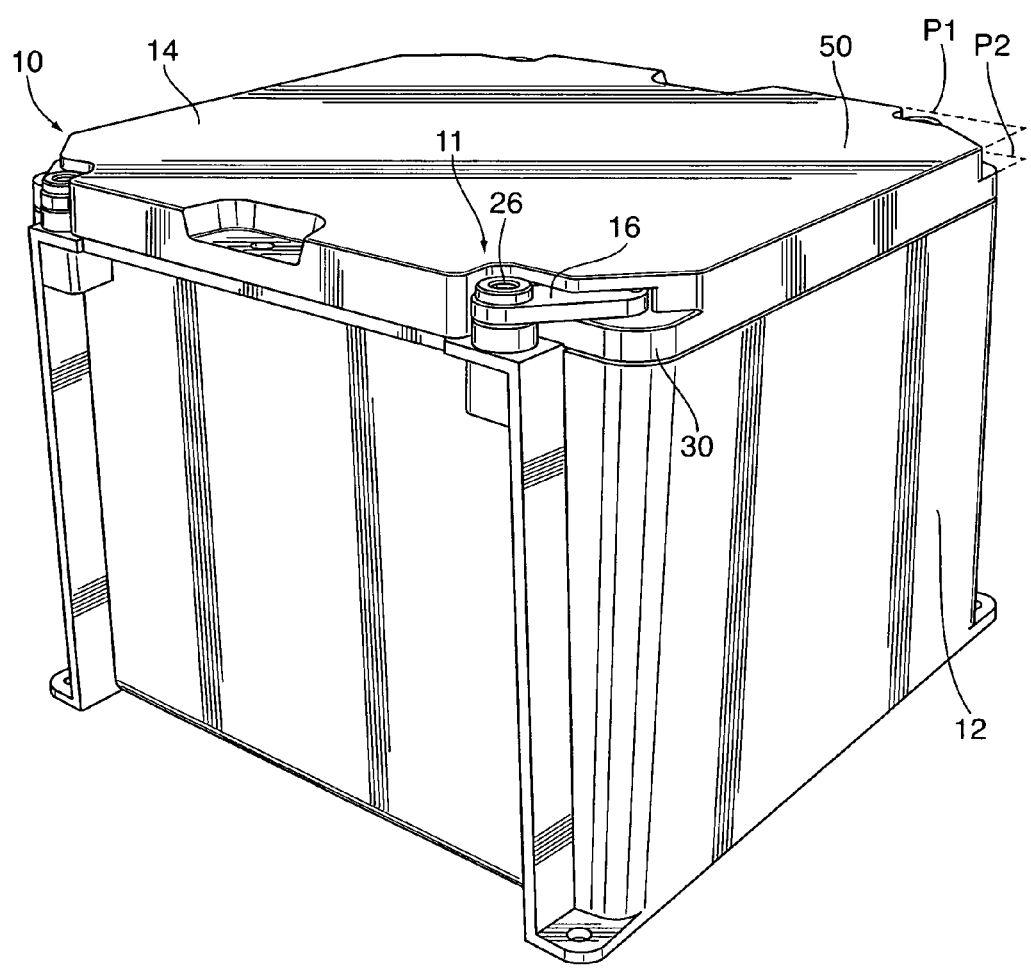
FIG. 1 shows a perspective view of an electrical junction box with fasteners in a closed position according to one embodiment of the present invention.
Figure 2:
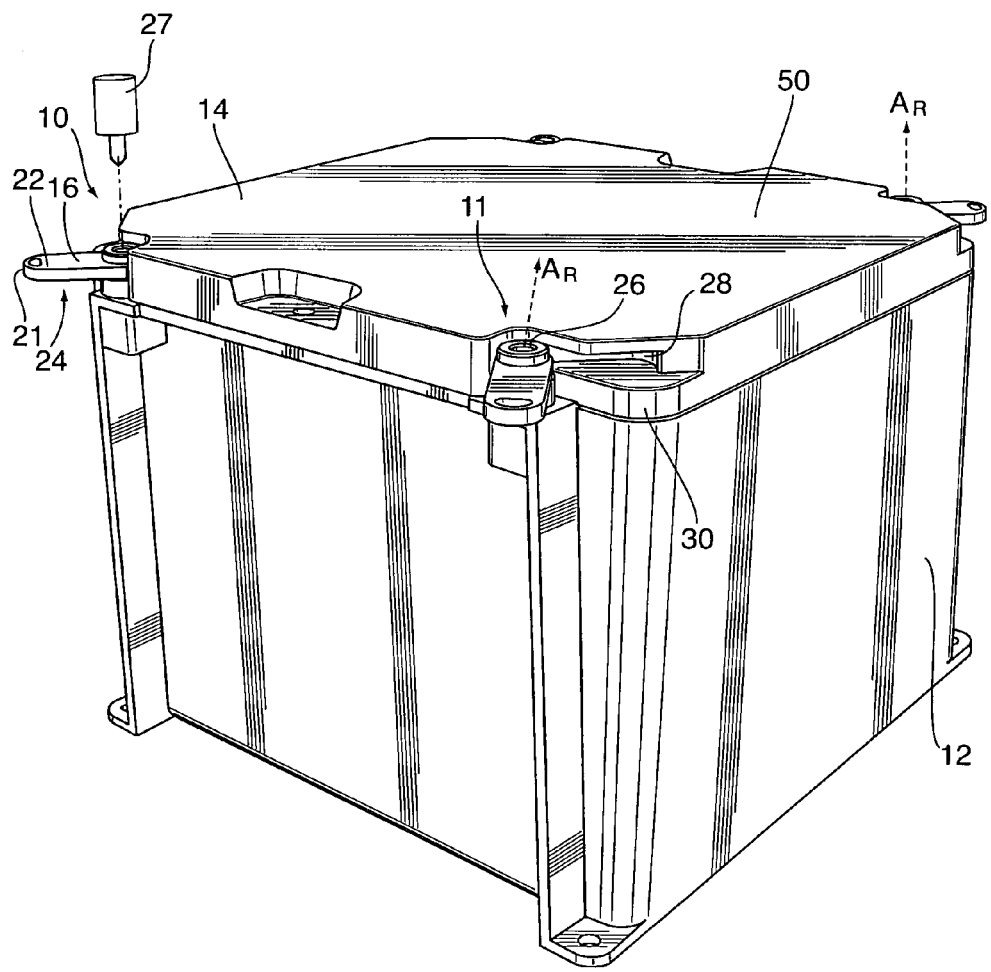
FIG. 2 shows a perspective view of the electrical junction box with fasteners in an open position.
Figure 3:
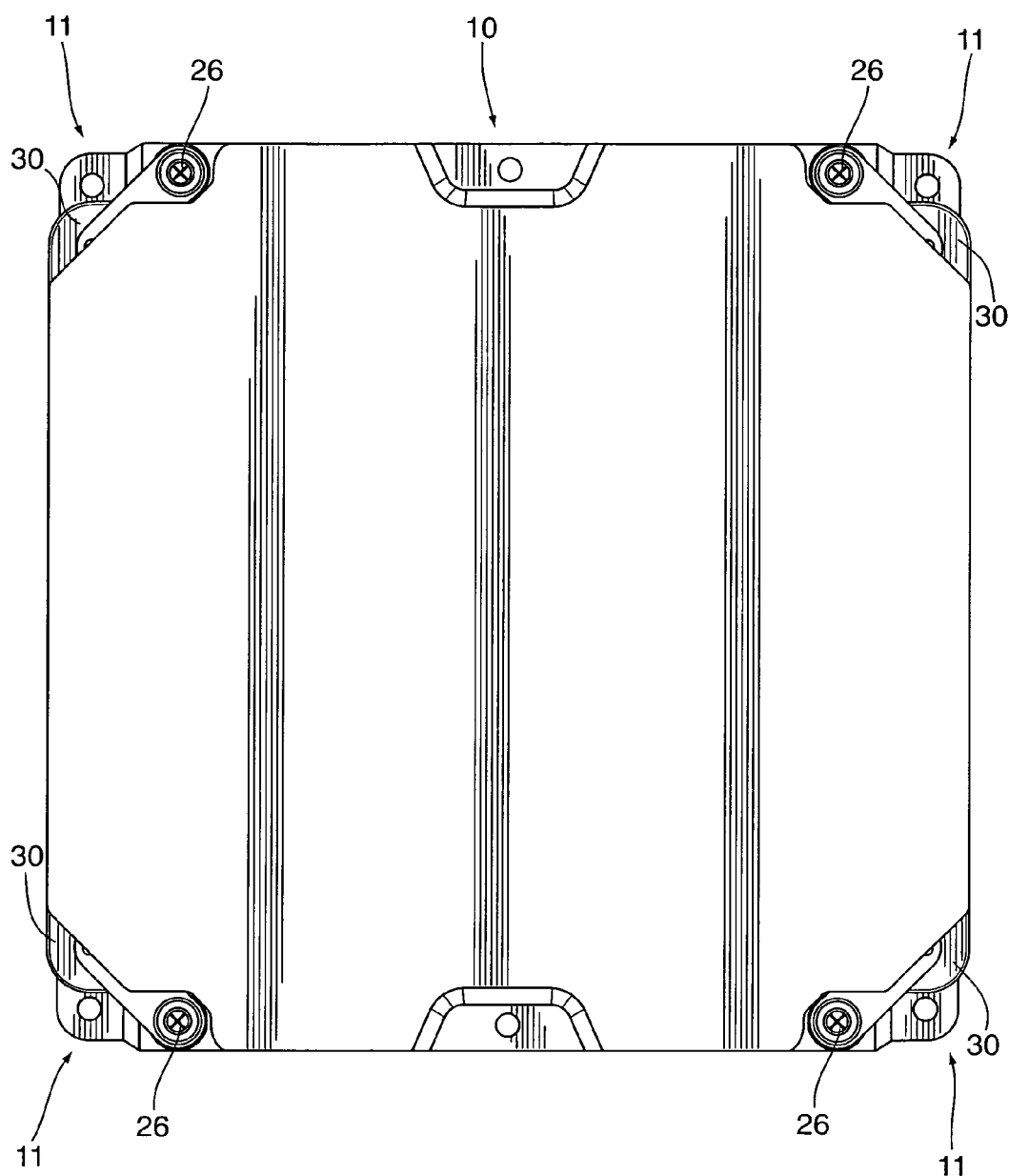
FIG. 3 shows a top view of the electrical junction box with fasteners in the closed position.

As shown in FIGS. 1 to 3, one embodiment of the present invention relates to an electrical junction box 10 with at least one and preferably two or more fastener assemblies 11. Electrical junction box 10 may, in one embodiment, be used for holding electrical connections and can be used to conceal such electrical connections from sight and deter unauthorized tampering therewith. Electrical junction box 10 can be made from suitable plastic materials and provide electrical insulation as required by some building codes.

The electrical junction box 10 comprises a container 12, a lid 14, and at least one fastener 16. Preferably, the box 10 comprises four fasteners 16, one at each corner. Each fastener 16 is part of a fastener assembly 11 for securely holding the lid 14 to the container 12. When the fasteners 16 are in the closed position (shown in FIGS. 1 and 3) the lid 14 is securely fastened to the container 12. When the fastener 16 is in the open position (shown in FIG. 2) the lid 14 and container 12 are detachable from each other.

As best shown in FIG. 4, each fastener 16 has a first end 18 and a second end 20. The first end 18 may be rotatably fixed to the container 12, as more fully described below. The second end 20 has a manual rotating mechanism 21, which in this preferred embodiment is a tab 22 that permits rotation by hand of the fastener 16 from the open position to the closed position. The underside of the tab 22 preferably has a fastening surface 24 that is used in fastening the lid 14 to the container 12, as more fully described below. Also, at the second end 20 of the fastener 16 preferably comprises a tool-operated rotating mechanism 26. Preferably, the tool-operated rotating mechanism 26 permits rotation by a screwdriver 27 of the fastener 16 between the closed and open positions. The tool-operated rotating mechanism 26 cannot be easily operated by an unaided human hand.

By extending laterally from the axis of rotation $A_R$ of the fastener 16, the tab 22 provides leverage for rotating the fastener 16 by hand. It is understood that the invention may comprise other types of manual rotating mechanisms 21, and is not limited to a tab 22. In general, the manually operated rotating mechanism 21 is preferably offset from the axis of rotation $A_R$, will provide for relatively easy rotation of the fastener 16 by hand from the open position to the closed position and may provide a lever of some type to accomplish this. In contrast, the tool-operated rotating mechanism 26 may be substantially aligned with the axis of rotation $A_R$ and therefore lacks this leverage and ease of rotation by hand. This makes it easier to rotate the fastener 16 using the tab 22 than it is to rotate fastener 16 using the tool-operated rotating mechanism 26, as less force is required to rotate the fastener 16 with the tab 22 than the tool-operated rotating mechanism 26. As will be described later, this increases the security of the fastener assembly 11.

In a preferred embodiment, the tool-operated rotating mechanism 26 requires 7 to 13 lbf-in of torque to rotate the fastener from the closed position to the open position. In contrast, the manual rotating mechanism 21 will preferably require less than 6 lbf-in of torque.

As best shown in FIG. 2, the lid 14 has four recesses 28 (only one of which is visible in FIG. 2). Each recess 28 is designed to receive at least a portion of the manual operated rotating mechanism 21 when the fastener 16 is rotated into the closed position, which in this embodiment comprises the tab 22 (shown in FIGS. 1 and 3). This makes the tab 22 substantially manually inaccessible when the fastener 16 is in the closed position. The tool-operated rotating mechanism 26, however, remains accessible when the fastener 16 is in the closed position. Accordingly, during operation the fastener 16 can be rotated from the open position to the closed position manually using the tab 22, at which point the tab 22 is not easily accessible by hand because at least a portion is in the recess 28. In this way, the fastener 16 can be moved to the open position using the tool-operated rotating mechanism 26. This feature is particularly advantageous in one embodiment, as it allows the lid 14 to be secured to the container 12 relatively quickly and easily, by a user manually rotating the fastener 16 using the manually rotating mechanism 21, in this embodiment the tab 22, while also providing added security by requiring a screwdriver 27 or other tool, to move the fastener 16 back into the open position. This reduces the likelihood of unauthorized unfastening, as only those with the required tool are able to unfasten the lid 14 from the container 12. This likewise decreases the chances of accidental unfastening, as the tab 22 is inaccessible and thus is less likely to be accidentally engaged and rotated into the open position. The extra force required to rotate the fastener 16 using the tool-operated rotating mechanism 26 also provides added security, by making the electrical junction box 10 even more difficult to open. These features can help to prevent access to the contents of the electrical junction box 10 by children, animals or unauthorized persons. This is important as the contents of the electrical junction box 10 may be dangerous, valuable and/or delicate. Also, the contents of the electrical junction box 10 could be damaged if tampered with.

The lid 14 preferably has a flange 30 preferably located adjacent each recess 28 (shown in FIGS. 1 to 3). When the fastener 16 is in the closed position, the flange 30 is located intermediate the fastening surface 24 of the tab 22 and the container 12, so as to fasten the lid 14 and the container 12 together (FIGS. 1 and 3). In this way, the tab 22 may serve a dual purpose, permitting manual rotation of the fastener 16, as well as comprising the fastening surface 24 which acts on the flange 30 to fasten the lid 14 to the container 12. When the fastener 16 is in the open position, the flange 30 is no longer intermediate the fastening surface 24 of the tab 22 and the container 12, and the lid 14 can be detached from the container 12.

Figure 7:
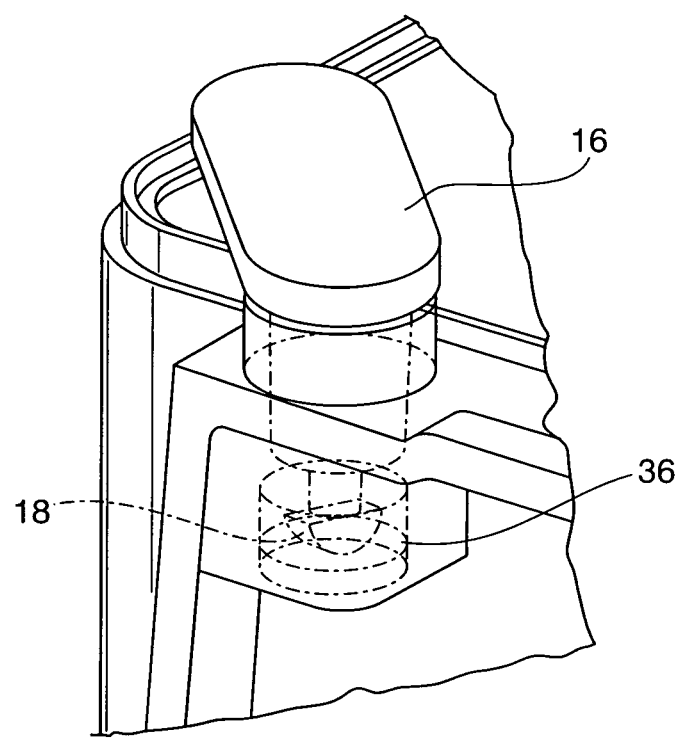
FIG. 7 shows a partially transparent perspective view of a fastener held within a bore of an electrical junction box container.

The fasteners 16 may be releasably fixed to the container 12 at bores 32 (shown in FIGS. 4 to 7). In this preferred embodiment, there are four bores 32 in the container 12, one for each of the four fasteners 16. Each bore 32 has two radial slots 34 (FIG. 5) and an inner cavity 36 (FIG. 7). Each bore 32 is designed to engage with the first end 18 of the fastener 16, which has two terminal extensions 38 (FIG. 4). The radial slots 34 are shaped so as to allow the first end 18 to pass therethrough when the terminal extensions 38 are in alignment with the radial slots 34 (FIG. 6). The inner cavity 36 is located below the radial slots 34. Once in the inner cavity 36, the first end 18 of the fastener 16 is able to rotate freely. The first end 18 can only be extracted from the inner cavity 36 when the terminal extension 38 is back in alignment with the radial slots 34. When the fastener 16 is in the closed position, the terminal extensions 38 are out of alignment with the radial slots 34, and the fastener 16 is therefore fixed to the container 12. In this way, the fastener 16 clamps the lid 14 and the container 12 together, with the terminal extensions 38 trapped in the inner cavity 36 of the container 12 at the first end 18, and the fastening surface 24 of the tab 22 abutting against the flange 30 of the lid 14 at the second end 20.

In a preferred embodiment, the bores 32 are each provided with a small protrusion 40 (FIG. 5). The protrusion 40 causes the bore 32 to be just slightly smaller than the first end 18 of the fastener 16. In this way, the protrusion 40 keeps the first end 18 captive within the inner cavity 36, even when the terminal extensions 38 are in alignment with the radial slots 34, unless a force greater than gravity is applied to removing the fastener 16. This feature is advantageous as it keeps the fastener 16 more securely fixed to the container 12 so that it is less likely to be accidentally detached therefrom, even when the box 10 is oriented on a wall or ceiling such that gravity is acting on the fastener 16 to remove it from the bore 32.

Figure 8:
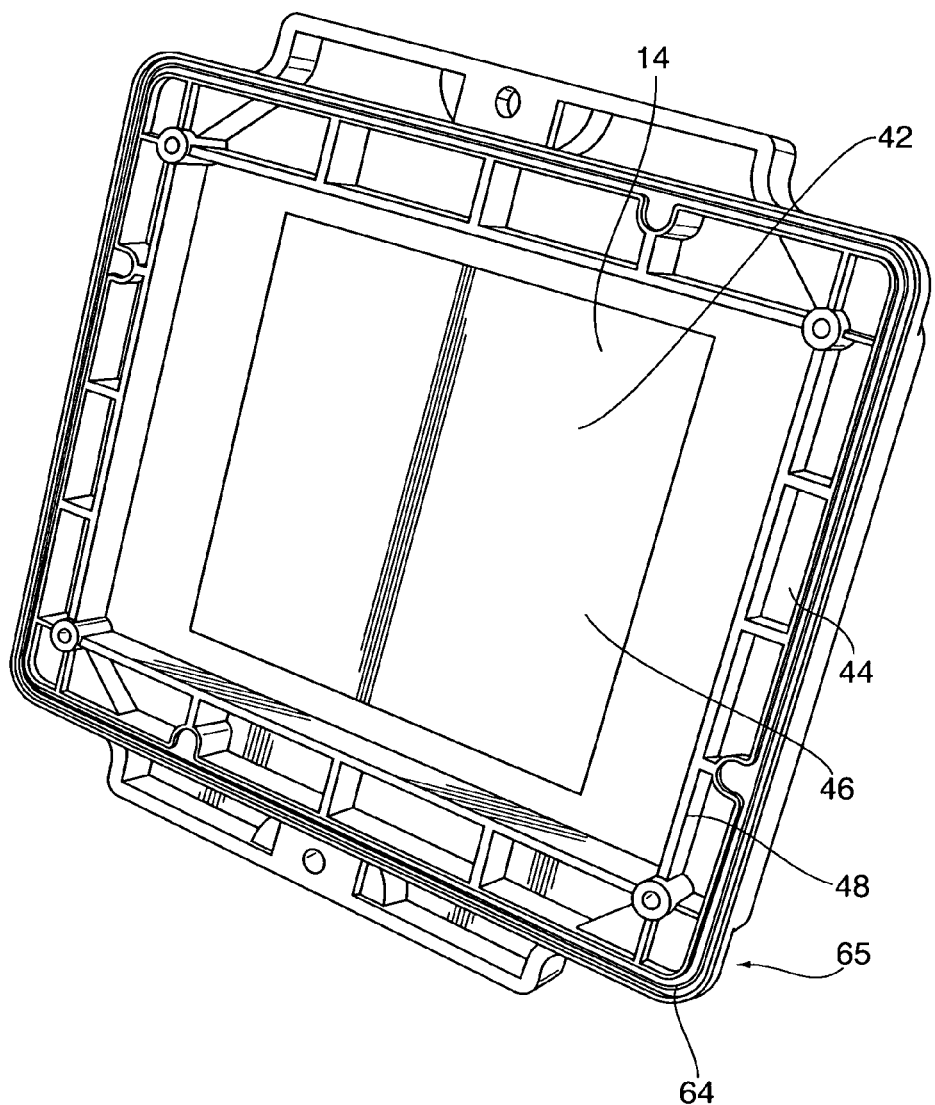
FIG. 8 shows a perspective view of the underside of a lid for the electrical junction box according to one embodiment of the present invention.

In a preferred embodiment, the lid 14 has an inner surface 42, best shown in FIG. 8. The inner surface 42 has a perimeter portion 44 and a center portion 46. The perimeter portion 44 is provided with supporting ribs 48, which provide additional structural support to the lid 14. Because the center portion 46 of the lid 14 is free of supporting ribs 48, a user of the electrical junction box 10 can open holes in the center portion 46 of the lid 14 to run wires therethrough, for example, without interfering with the additional support provided by the supporting ribs 48.

The lid 14 also preferably comprises a gasket 64 which extends along the perimeter 65 of the lid 14. In this way, the gasket 64 provides additional protection from the elements when the lid 14 is fastened to the container 12. More preferably, the gasket 64 engages a groove, (not shown) on the rim of the container 12 to provide additional insulation from the environment. In a preferred embodiment, the box 10 is watertight when the lid 14 is fastened to the container 12 such that it could be completely submerged in water, saline solution or other fluids without affecting the components contained therein.

The lid 14 also has an outer surface 50 opposite the inner surface 42 (shown in FIG. 1). The outer surface 50 is located in a first plane P1. The flanges 30 are preferably located in a second plane P2, and the recesses 28 are intermediate the first plane P1 and the second plane P2 (see FIG. 1). The recesses 28 are each located proximate to the perimeter portion 44 of the lid 14, such that the supporting ribs 48 are able to provide added support particularly in the area of the recesses 28. This improves the security of the electrical junction box 10, as this added support may decrease the likelihood of the lid 14 cracking or breaking in the area of the recesses 28, thereby exposing the tab 22 or otherwise detaching the lid 14 from the container 12.

Figure 9:
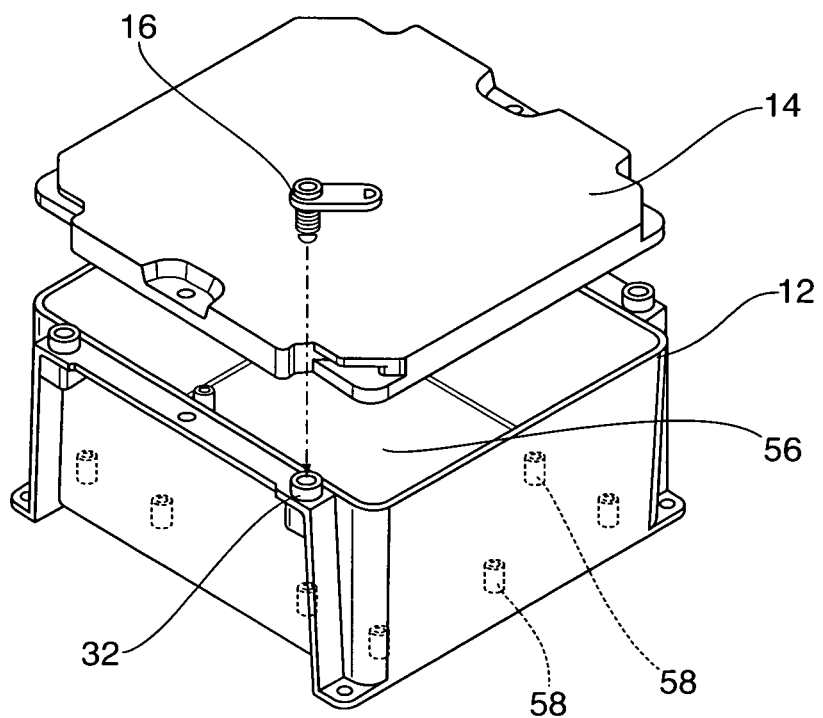
FIG. 9 shows a partially transparent exploded view of an electrical junction box.

The container 12 has a bottom 56, shown in FIG. 9. The bottom 56 of the container 12 is provided with a number of mounting bosses 58. The mounting bosses can be used, for example, for a back panel or a DIN rail.

Figure 10A:
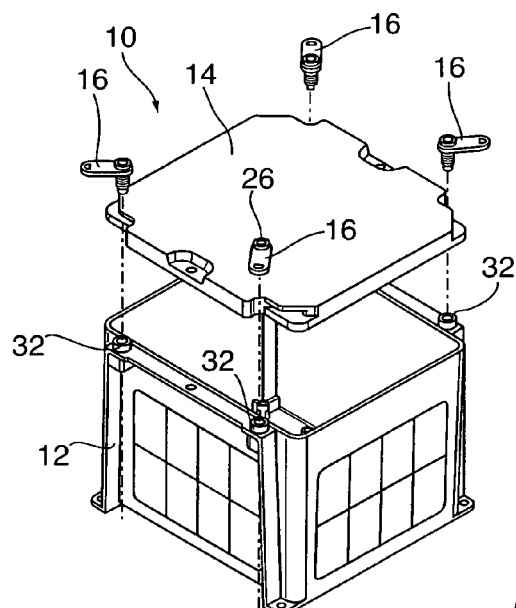
FIG. 10A shows an exploded view of an electrical junction box.
Figure 10B:
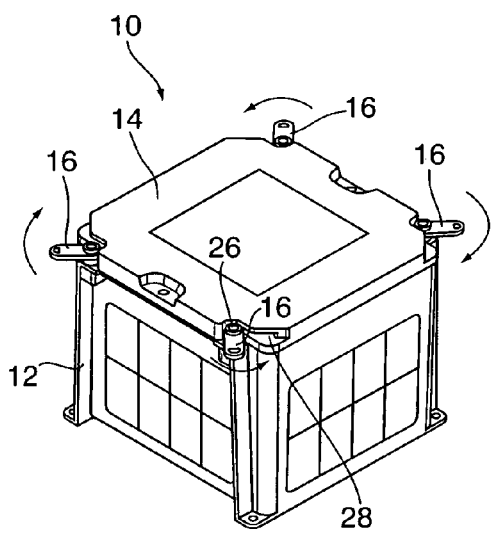
FIG. 10B shows a perspective view of an electrical junction box with fasteners in the open position.
Figure 10C:
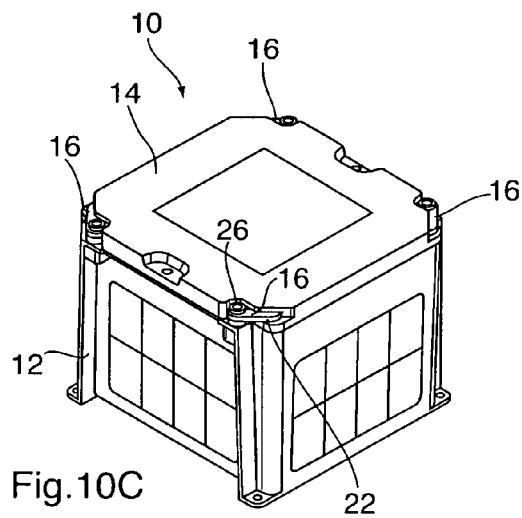
FIG. 10C shows a perspective view of an electrical junction box with fasteners in the closed position.

FIGS. 10A, 10B and 10C illustrate the process of assembling the electrical junction box 10. FIG. 10A shows the container 12, the lid 14, and the four fasteners 16 detached from one another, but in alignment for assembly. Initially, each of the fasteners 16 are inserted into the corresponding bores 32 in the container 12 (shown in FIG. 10B), which may be done at the time of manufacture, or, at a later time in the field. The electrical junction box 10 is then closed by mounting the lid 14 onto the top of the container 12 such as after components have been inserted in the box 10 and any connection made to the box 10 and components therein. To fasten the lid 14 to the container 12, each of the fasteners 16 are rotated, as shown by the arrows in FIG. 10B by manually operating the manual rotating mechanism 21, in this embodiment being the tabs 22. When the lid 14 is fastened to the container 12, at least a portion of each tab 22 is received in a corresponding recess 28 in the lid 14 (shown in FIG. 10C). The electrical junction box 10 is now securely fastened, and can only be unfastened by using a tool, such as a screwdriver 27 in this embodiment, to operate the tool-operated rotating mechanisms 26 of the fasteners 16.

Although the foregoing detailed description has described a preferred embodiment of the invention as an electrical junction box 10, the invention is not so limited. The fastener assemblies 11 could be used to hold a lid 14 on any type of container 12, and not just an electrical junction box 10. For example, the fastener assemblies 11 could be used with shipping containers or storage containers. Furthermore, the fasteners assemblies 11 could be used for securing any suitable objects together, and need not be limited to a lid 14 and a container 12. For example, fastener assemblies 11 could be used for securing a door to a building. This could be useful, for example, if the building is to be vacant for a stretch of time, with the fastener assemblies 11 providing additional security by helping to prevent unauthorized access.

Although the tool-operated rotating mechanism 26 has been described as for engagement with a screwdriver 27, the invention is not so limited. The tool-operated rotating mechanism 26 could be designed for operation by any other suitable tool, such as a wrench, pliers, or an electric screwdriver or drill. The amount of torque required to rotate the tool-operated rotating mechanism 26 from the closed position to the open position does not necessarily need to fall within the range of 7 to 13 lbf-in, as described in the preferred embodiments. Preferably the tool-operated rotating mechanism 26 is aligned with the axis of rotation to increase the torque required to open the fastener 16. The amount of torque required can be selected according to the preferences of the user, the application to which the fastener assemblies 11 are being put, and/or the type of tool to be used. For example, if an electrically powered tool is to be used, the amount of torque required can be increased to provide additional security. The tool-operated rotating mechanism 26 could also be operated by a unique tool or key (not shown) to provide added security.

Although the manual rotating mechanism 21 has been described in the preferred embodiments as a tab 22, the invention is not so limited. The manual rotating mechanism 21 can have any suitable size, shape and configuration that allows for engagement and rotation by a human hand or finger. For example, the manual rotating mechanism 21 may be a ring, a rod, or a hook. The type of manual rotating mechanism 21 to be used can be selected according to the preferences of the user, and/or the size/shape of the lid 14, or other suitable object to be fastened. Preferably at least a portion of the manual rotating mechanism 21 is received by the recess 28 to restrict manual movement of the manual rotating mechanism 21 in the closed position. Preferably at least a portion of the manually operated rotating mechanism 21 is offset or extends beyond the axis of rotation $A_R$ of the fastener 16 to provide leverage and decrease the torque required to rotate the fastener 16 to the closed position.

Although the fasteners 16 have been described in the preferred embodiments as releasably fixed to the container 12 at bores 32, the invention is not so limited. The fasteners 16 could instead be permanently rotateably fixed to the container 12, for example with a rope or a swivel connection. The fasteners 16 could also be releasably fixed to the container 12 using a different mechanism from the one described in the preferred embodiments. For example, the fasteners 16 could use a hook, releasable strap, or other suitable fastening mechanism that allows rotation of the fasteners 16.

Although the protrusion 40 has been described as located in the bore 32, the protrusion 40 could instead be located on the first end 18 of the fastener 16. This would likewise make the first end 18 of the fastener 16 slightly larger than the bore 32, such that a force greater than gravity would be required to extract the first end 18 from the inner cavity 36. The size, shape, and material of the protrusion 40 can be selected to achieve the desired amount of force required for extraction.

Optionally, the fastener assemblies 11 produce an audible click when the fastener 16 moves from the open position into the closed position. This provides a readily detected indication that the fastener 16 is now in the closed position, and helps make the fastening process quicker and easier by letting the user know that the fastener 16 is now closed.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in the specification. Notwithstanding this limitation on the inference of "special definitions", the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A fastener assembly for releasably fastening a first body to a second body, the fastener assembly comprising:
   a moveable fastening member rotatably fixed to the first body, said moveable fastening member having an open position, in which the first body and the second body are detachable from each other, and a closed position, in which the first body and the second body are fastened together;
   a manual rotating mechanism on the moveable fastening member that permits rotation by hand of the moveable fastening member from the open position to the closed position;
   a recess in the second body that receives at least a portion of the manual rotating mechanism when the moveable fastening member is in the closed position so as to be inaccessible by hand, and thereby prevent manual movement of the moveable fastening member from the closed position to the open position; and
   a tool-operated rotating mechanism on the moveable fastening member that is accessible when the moveable fastening member is in the closed position and permits rotation by a tool of the moveable fastening member from the closed position to the open position;
   wherein the tool-operated rotating mechanism is incapable of being operated by an unaided human hand; and
   wherein the moveable fastening member can only be rotated from the closed position to the open position by using the tool to operate the tool-operated rotating mechanism;
   the fastener assembly further comprising:
   a flange on the second body; and
   wherein the manual rotating member comprises a tab having a fastening surface; and
   wherein the flange is located intermediate the fastening surface and the first body when the moveable fastening member is in the closed position so as to fasten the first body and the second body together.

2. The fastener assembly according to claim 1, wherein the moveable fastening member has a first end that is rotatably fixed to the first body, and a second end located remotely from the first end; and
   wherein the tool-operated rotating mechanism is located at the second end of the moveable fastening member.

3. The fastener assembly according to claim 1, wherein the first body is a container and the second body is a lid; and
   wherein the recess is located in the lid.

4. The fastener assembly according to claim 1, wherein the tool-operated rotating mechanism is operable to be engaged with a screwdriver.

5. The fastener assembly according to claim 1, wherein the tool-operated rotating mechanism requires 7 to 13 lbf-in of torque to rotate the moveable fastening member from the closed position to the open position.

6. The fastener assembly according to claim 1, wherein the moveable fastening member is releasably fixed to the first body to permit rotation along an axis of rotation; and
wherein the manual rotating mechanism is offset from the axis of rotation, and, the tool operated rotating mechanism is substantially aligned with the axis of rotation.

7. A fastener assembly for releasably fastening a first body to a second body the fastener assembly comprising:
a moveable fastening member rotatably fixed to the first body, said moveable fastening member having an open position, in which the first body and the second body are detachable from each other, and a closed position, in which the first body and the second body are fastened together;
a manual rotating mechanism on the moveable fastening member that permits rotation by hand of the moveable fastening member from the open position to the closed position;
a recess in the second body that receives at least a portion of the manual rotating mechanism when the moveable fastening member is in the closed position so as to he inaccessible by hand, and thereby prevent manual movement of the moveable fastening member from the closed position to the open position; and
a tool-operated rotating mechanism on the moveable fastening member that is accessible when the moveable fastening member is in the closed position and permits rotation by a tool of the moveable fastening member from the closed position to the open position;
wherein the tool-operated rotating mechanism is incapable of being o crated b an unaided human hand; and
wherein the moveable fastening member can only be rotated from the closed position to the open position by using the tool to operate the tool-operated rotating mechanism;
wherein the moveable fastening member is releasably fixed to the first body to permit rotation along an axis of rotation; and
wherein the manual rotating mechanism is offset from the axis of rotation, and, the tool operated rotating mechanism is substantially aligned with the axis of rotation.

8. The fastener assembly according to claim 7, further comprising:
a bore in the first body having at least one radial slot and an inner cavity;
wherein a first end of the moveable fastening member has at least one terminal extension that prevents the first end of the moveable fastening member from passing in and out of the inner cavity except when the at least one terminal extension is aligned with the at least one radial slot; and
wherein the at least one terminal extension and the at least one radial slot are not aligned when the moveable fastening member is in the closed position.

9. The fastener assembly according to claim 8, wherein at least one of the bore and the first end of the moveable fastening member has a protrusion that prevents the first end of the moveable fastening member from passing out of the inner cavity when the at least one terminal extension is aligned with the at least one radial slot, unless a force greater than gravity is applied to the moveable fastening member.

10. An electrical junction box, comprising:
a container;
a lid detachably securable to the container and having at least one recess; and
at least one fastener rotatably fixed to the container, each fastener comprising:
a manual rotating mechanism that permits movement by hand of the fastener from an open position, in which the container and the lid are detachable from each other, to a closed position, in which the container and the lid are secured together and at least a portion of the manual rotating mechanism is received in a corresponding one of the recesses so as to be inaccessible by hand, and thereby prevent manual movement of the fastener from the closed position to the open position; and
a tool-operated rotating mechanism that is accessible when the fastener is in the closed position and permits rotation of the fastener by a tool from the closed position to the open position;
wherein the tool-operated rotating mechanism is incapable of being operated by an unaided human hand; and
wherein the fastener can only be rotated from the closed position to the open position by using the tool to operate the tool-operated rotating mechanism;
wherein the lid has at least one flange; and
wherein the manual rotating mechanism comprises a tab having a fastening surface; and
wherein each flange is located intermediate the fastening surface of a corresponding one of said fasteners and the container when said fastener is in the closed position.

11. The electrical junction box according to claim 10, wherein the tool-operated rotating mechanism requires 7 to 13 lbf-in of torque to rotate the fastener from the closed position to the open position.

12. The electrical junction box according to claim 10, wherein the lid has an inner surface with a perimeter portion and a center portion; and
wherein the lid further comprises supporting ribs positioned only on the perimeter portion of the inner surface.

13. The electrical junction box according to claim 12, wherein the lid has an outer surface opposite the inner surface, said outer surface being in a first plane which is parallel to a second plane containing said at least one flange; and
wherein the at least one recess is intermediate the first plane and the second plane.

14. The electrical junction box according to claim 13, wherein the supporting ribs are proximate the at least one recess.

15. The electrical junction box according to claim 10, wherein a bottom of the container has mounting bosses.

16. The electrical junction box according to claim 10, wherein there are four fasteners and the lid has four recesses.

17. The electrical junction box according to claim 10,
wherein each fastener has a first end that is rotatably fixed to the container to permit rotation along an axis of rotation, and a second end located remotely from the first end; and
wherein the tool-operated rotating mechanism is located at the second end of the fastener and is substantially aligned with the axis of rotation; and
wherein at least a portion of the manual rotating mechanism is offset from the axis of rotation.

18. The electrical junction box according to claim 10, wherein the container has at least one bore, each bore having at least one radial slot and an inner cavity; and
wherein the first end of each fastener has at least one terminal extension that prevents the first end from passing in and out of the inner cavity of a corresponding one of said bores except when the at least one terminal extension is aligned with the at least one radial slot; and wherein the at least one terminal extension and the at least one radial slot are not aligned when the fastener is in the closed position.

19. An electrical junction box, comprising:
a container;
a lid detachably securable the container and having at least one recess; and
at least one fastener rotatably fixed to the container, each fastener comprising:
a manual rotating mechanism that permits movement by hand of the fastener from an open position, in which the container and the lid are detachable from each other, to a closed position, in which the container and the lid are secured together and at least a portion of the manual rotating mechanism is received in a corresponding one of the recesses so as to be inaccessible by hand, and thereby prevent manual movement of the fastener from the closed position to the open position; and
a tool-operated rotating mechanism that is accessible when the fastener is in the closed position and permits rotation of the fastener by a tool from the closed position to the open position;
wherein the tool-operated rotating mechanism is incapable of being operated unaided human hand; and
wherein the fastener can only be rotated from the closed position to the open position by using the tool to operate the tool-operated rotating mechanism;
wherein each fastener has a first end that is rotatably fixed to the container to permit rotation along an axis of rotation, and a second end located remotely from the first end; and
wherein the tool-operated rotating mechanism is located at the second end of the fastener and is substantially aligned with the axis of rotation; and
wherein at least a portion of the manual rotating mechanism is offset from the axis of rotation.

20. An electrical junction box, comprising:
a container;
a lid detachably securable to the container and having a east one recess; and
at least one fastener rotatably fixed to the container, each fastener comprising;
a manual rotating mechanism that permits movement by hand of the fastener from an open position, in which the container and the lid are detachable from each other, to a closed position, in which the container and the lid are secured together and at least a portion or the manual rotating mechanism is received in a corresponding one of the recesses so as to be inaccessible by hand, and thereby prevent manual movement of the fastener from the closed position to the open position; and
a tool-operated rotating mechanism that is accessible when the fastener is in the closed position and permits rotation of the fastener by a tool from the closed position to the open position;
wherein the tool-operated rotating mechanism is incapable of being operated by an unaided human hand; and
wherein the fastener can only be rotated from the closed position to the open position by using the tool to operate the tool-operated rotating mechanism;
wherein the container has at least one bore, each bore having at least one radial slot and an inner cavity; and
wherein the first end of each fastener has at least one terminal extension that prevents the first end from passing in and out of the inner cavity of a corresponding one of said bores except when the at least one terminal extension is aligned with the at least one radial slot; and
wherein the at least one terminal extension and the at least one radial slot are not aligned when the fastener is in the closed position.

\* \* \* \* \*